United States Patent [19]
Wissmann et al.

[11] Patent Number: 5,200,205
[45] Date of Patent: Apr. 6, 1993

[54] EXTRUDER BARREL TEMPERATURE REGULATION APPARATUS

[75] Inventors: Siegfried R. Wissmann; Christopher P. Surface, both of Cincinnati, Ohio

[73] Assignee: Cincinnati Milacron Inc., Cincinnati, Ohio

[21] Appl. No.: 690,277

[22] Filed: Apr. 24, 1991

[51] Int. Cl.$^5$ .............................. B29C 47/00
[52] U.S. Cl. ............................ 425/200; 425/378.1
[58] Field of Search ............... 425/200, 378.1, 204, 425/205, 206, 207, 208, 376.1

[56] References Cited

U.S. PATENT DOCUMENTS

| 2,774,107 | 12/1956 | Davis | 18/12 |
|---|---|---|---|
| 3,733,059 | 6/1973 | Pettit | 259/191 |
| 3,743,252 | 7/1973 | Schott, Jr. | 259/191 |
| 4,154,535 | 5/1979 | Maillefer | 366/79 |
| 4,319,871 | 3/1982 | McAlister | 425/376 |
| 4,721,589 | 1/1988 | Harris | 264/40.1 |
| 4,758,146 | 7/1988 | Piazzola | 425/144 |

OTHER PUBLICATIONS

Griff, Alan L. *Plastics Extrusion Technology*, Reinhold Publishing Corporation, New York, N.Y.: 1962, pp. 11-14 & 192-193.

*Primary Examiner*—David A. Simmons
*Assistant Examiner*—William J. Matney, Jr.
*Attorney, Agent, or Firm*—Nies, Kurz, Bergert & Tamburro

[57] ABSTRACT

Extruder barrel temperature control apparatus in the form of a plurality of axially spaced tubular shells positioned in end-to-end relationship on the outer surface of a tubular extruder barrel. Each of the shells includes individual resistance heater elements embedded in the shell wall for providing heat to maintain a desired shell temperature. Each shell includes two groups of outwardly extending cooling fins, each group axially spaced from the other, and each group of fins has an associated air blower positioned below the fins and supported by an outer casing surrounding the extruder barrel. The outer casing includes an internal shroud to confine the cooling air flow so it is directed over and along the cooling fins. The heating elements and the blower motors are connected with a suitable control system for providing and maintaining a desired temperature level at the barrel inner surface. Six such shells defining six respective heating and cooling zones are disclosed. A thermocouple is embedded in the walls of the respective shells for monitoring the shell wall temperature and to permit control adjustments to be made, as necessary to maintain a desired temperature level.

8 Claims, 2 Drawing Sheets

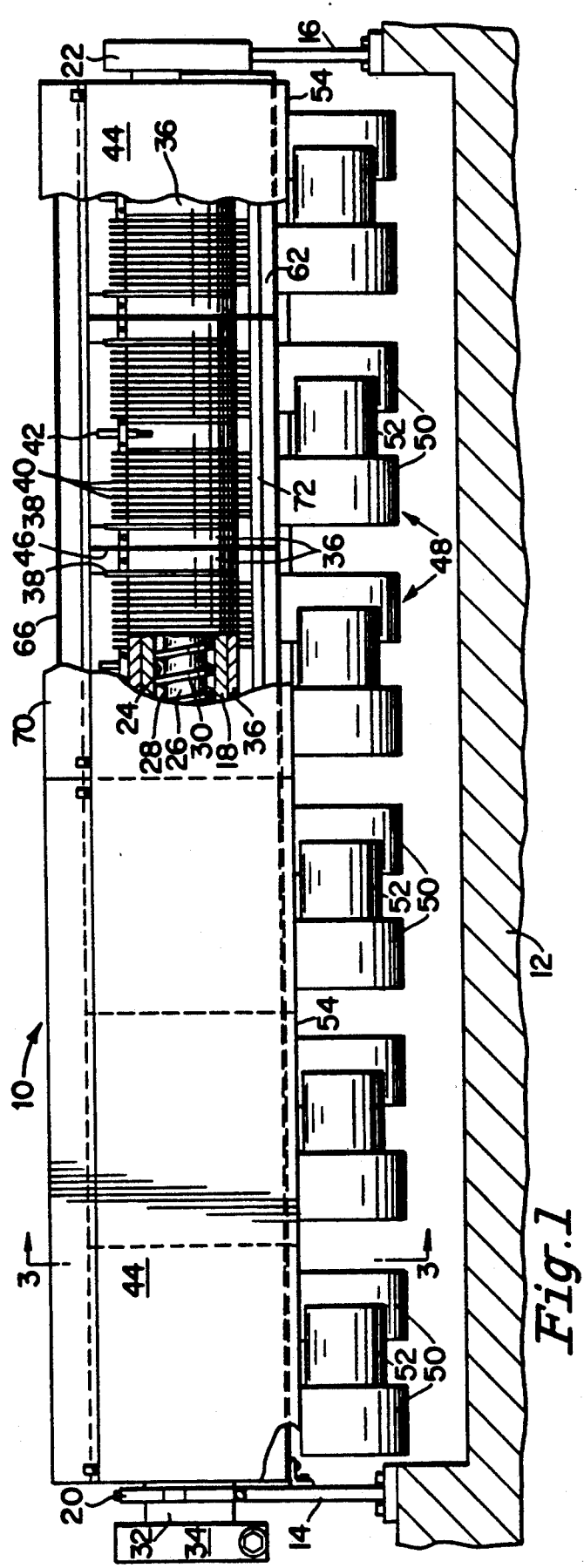
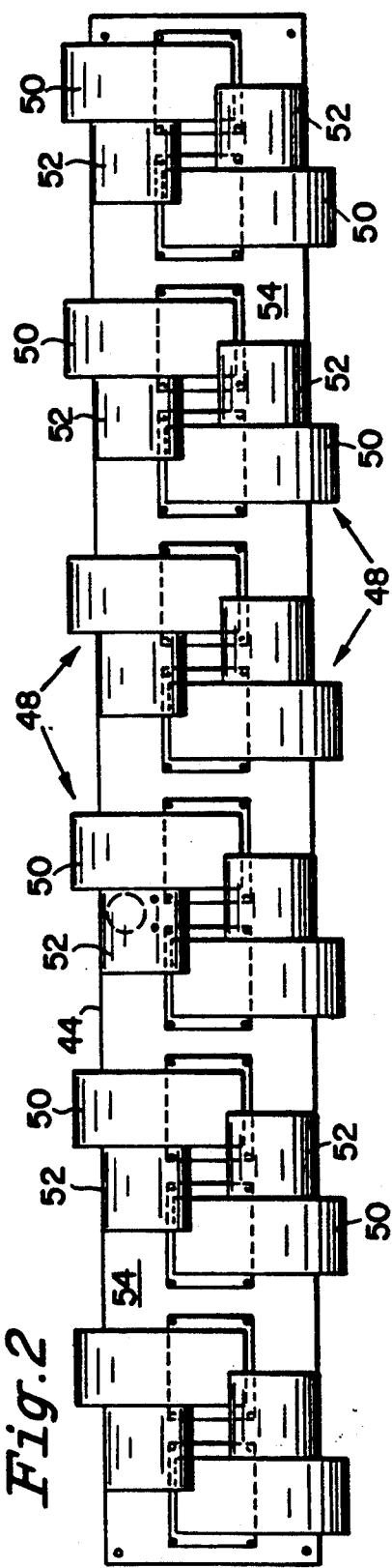
Fig.1
Fig.2

EXTRUDER BARREL TEMPERATURE REGULATION APPARATUS

BACKGROUND OF THE INVENTION

1. Field of the Invention

The present invention relates to apparatus for regulating the temperature of a tubular barrel within which an extrusion screw is rotatably carried. More particularly, the present invention relates to apparatus for improved extruder barrel temperature regulation by providing an outer sleeve to encircle the extruder barrel, the sleeve incorporating an interiorly positioned source of heat and having spaced groups of outwardly extending cooling fins, and a plurality of air blowers adapted to provide forced flow of cooling air to respective groups of the cooling fins.

2. Description of the Related Art

Extrusion equipment, such as the type for plasticating and extruding polymeric materials, includes a tubular barrel within which a plastication screw is rotatably carried for transporting within the barrel material to be plasticated. The material is initially provided in pelletized or powdered form, and is introduced into the barrel at one end, whereupon it is transported toward the other end by the rotating plastication screw. External sources of heat are provided on the outer surface of the barrel to heat the barrel, and thereby the material within the barrel, to hasten the softening process whereby the initially solid material is softened by heating to a viscous, flowable state. Resistance heater bands of annular form, helical fluid conduits within the barrel, and the like have been used in the past to provide heat to the barrel.

For certain materials the barrel temperature must be maintained within well-defined limits in order to avoid degradation of the material as a result of excessive heating. Regulation of the temperature of an extruder barrel has taken many different forms. For example, in U.S. Pat. No. 2,774,107, which issued Dec. 18, 1956, to B. H. Davis, there is shown an extruder barrel around which a tubular shell is provided, the shell incorporating internal resistance heating elements and having cooling fins. The cooling fins permit cooling of the barrel by allowing atmospheric air to flow by convection over the cooling fins.

In U.S. Pat. No. 4,154,535, which issued May 15, 1979, to Charles Maillefer, an extruder is disclosed in which a plurality of finned sleeves are provided, each of the sleeves including internal coolant ducts for the circulation therethrough of a cooling liquid for providing barrel temperature control.

In U.S. Pat. No. 4,721,589, which issued Jan. 26, 1988, to Holton E. Harris, an extruder is disclosed which includes a plurality of axially spaced outer jackets, each of the jackets including embedded electrical heating elements as well as embedded cooling coils. Temperature is regulated by controlling the power to the heating elements and the temperature of the coolant in the cooling coils in order to maintain the plasticated material at a desired viscosity level.

Although various heating and cooling arrangements have been proposed for regulating the temperature of an extruder barrel, in order to regulate the temperature of the plasticated material within the barrel, the arrangements heretofore proposed either have slow response times, such as by relying upon convection flow of cooling air, or are excessively complex by virtue of incorporating within sleeves both heat sources and liquid coolant channels.

It is therefore an object of the present invention to provide an improved extruder barrel temperature regulation system whereby separate sources of heat and of cooling are utilized in order to provide faster response to a desired change in barrel temperature.

It is another object of the present invention to provide an improved extruder barrel temperature regulating system that does not require the complexities and liquid leakage problems attendant with liquid circulation systems.

It is a still further objection of the present invention to provide an extruder barrel temperature regulating system in which a quick-acting arrangement is provided to maintain desired temperature profiles in each of a plurality of axially spaced zones along the axial length of the extruder barrel.

SUMMARY OF THE INVENTION

Briefly stated, in accordance with one aspect of the present invention, apparatus is provided for externally heating and cooling the exterior of a mixing chamber, such as an extruder barrel. The apparatus includes a tubular shell or sleeve having an inner surface adapted to contact the external surface of the mixing chamber. The shell includes interiorly disposed heat sources for heating the shell to a desired temperature, in order to transfer heat to the mixing chamber. A plurality of longitudinally spaced cooling fins extend substantially radially outwardly from an outer surface of the shell. A shroud is positioned around and in closely spaced surrounding relationship with the shell and is radially adjacent the fins for confining air movement substantially to the spaces between the fins. Forced air circulating means are provided and are positioned exteriorly of the shell and have an air flow outlet oriented to discharge air radially toward the shell and over the cooling fins to quickly carry away excessive heat and thereby to maintain the barrel temperature at a predetermined value.

BRIEF DESCRIPTION OF THE DRAWINGS

FIG. 1 is a fragmentary side elevational view, partially broken away, showing an extruder barrel incorporating barrel heating and cooling apparatus in accordance with the present invention.

FIG. 2 is a bottom view of the extruder shown in FIG. 1.

DESCRIPTION OF THE PREFERRED EMBODIMENTS

Figure 1A:
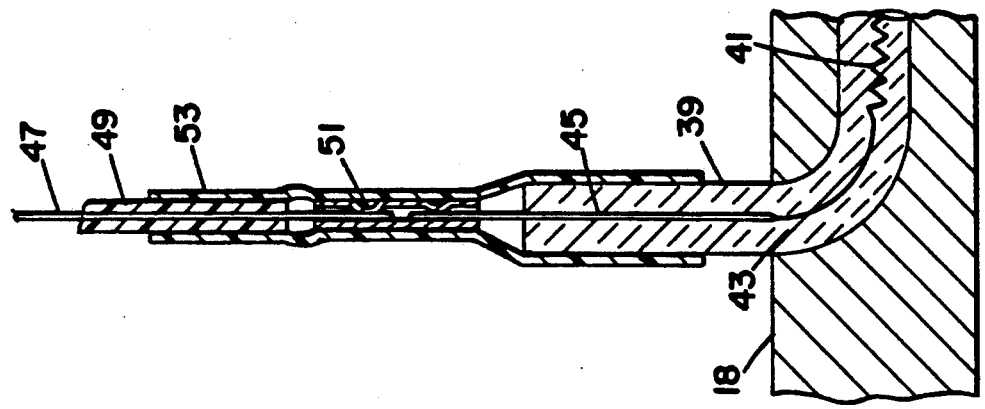
FIG. 1a is an enlarged, fragmentary view, partially in section, showing the sealed connection at the terminal of a resistance heater embedded in the extruder barrel.

Referring now to the drawings, and particularly to FIG. 1 thereof, there is shown the plastication barrel section of an extruder 10 which is supported on a base 12 by a front support pedestal 14 and a rear support pedestal 16. A tubular barrel 18 is supported in a front flange 20 and a rear flange 22, each of which is supported by respective pedestals 14, 16.

Barrel 18 has a cylindrical inner surface 24, and a plastication screw 26 is rotatably carried within the barrel. Screw 26 has a reduced diameter center portion 28 and one or more helical flights 30 that carry the material to be plasticated in a generally helical path toward the extruder outlet 32. A ring clamp 34 is provided at outlet 32 for connection of a suitable die head (not shown) to provide a desired extruded cross section.

A plurality of tubular shells 36 of annular cross section are provided around barrel 18 and are in contact with the exterior surface of the barrel. Shells 36 each have a predetermined wall thickness and axial extent, the axial extent selected to define respective individual temperature control zones along the longitudinal axis of barrel 18. Each shell 36 includes an interiorly embedded resistance heating element (not shown), which can be either of helical or serpentine configuration, and serves to provide heat to respective shell 36, which, in turn, provides heat to the outer surface of barrel 18 that is in contact with a shell 36. Each shell 36 includes a pair of sealed heater terminals 38 to permit connection of the internally embedded resistance heaters with a source of electrical power (not shown).

The structure of the sealed heater terminals is shown in greater detail in FIG. 1a. Heating element 39, which includes a substantially centrally positioned resistance wire 41 surrounded by compacted insulation 43, is embedded in heater body shell 36 and has an end that extends outwardly from the heater body shell. A terminal post 45 extends from the end of heating element 39 and is connected to the source of electrical power (not shown) by a connecting wire 47, which is surrounded by insulation 49, and which carries a crimped connector sleeve 51 to engage terminal post 45. The entire connection is surrounded by a sleeve 53 of heat-shrinkable polytetrafluoroethylene material that is positioned over the connection to overlap both the end of heating element 39 and the adjacent end of connecting wire 47, and is then heated to shrink sleeve 53 so that it tightly surrounds the connection to seal it from the entry of moisture and foreign material.

Referring once again to FIG. 1, extending outwardly from and integral with each individual shell 36 are two groups of cooling fins 40 that are axially spaced from each other a short distance, and between each of the groups of fins on a given shell 36 a thermocouple 42 is embedded within the shell wall for monitoring the shell temperature. Thermocouple 42 is a secondary thermocouple from the standpoint of control of barrel temperature, and in its preferred form the present invention includes thermocouples that are embedded within the barrel to provide direct readout of barrel temperature for more accurate and more direct control of the heating and cooling devices that are employed to provide the desired barrel temperature. Preferably shells 36 are made from cast aluminum, to provide rapid conduction of heat, and the fins are closely spaced and integrally formed with the shells and have a substantial radial length to promote quick cooling of the shells, when cooling is desired. In that regard, a preferred shell wall thickness is about ⅝", with a corresponding radial fin height of about 1", to provide a fin height to shell wall thickness ratio of about 1.6.

Figure 3:
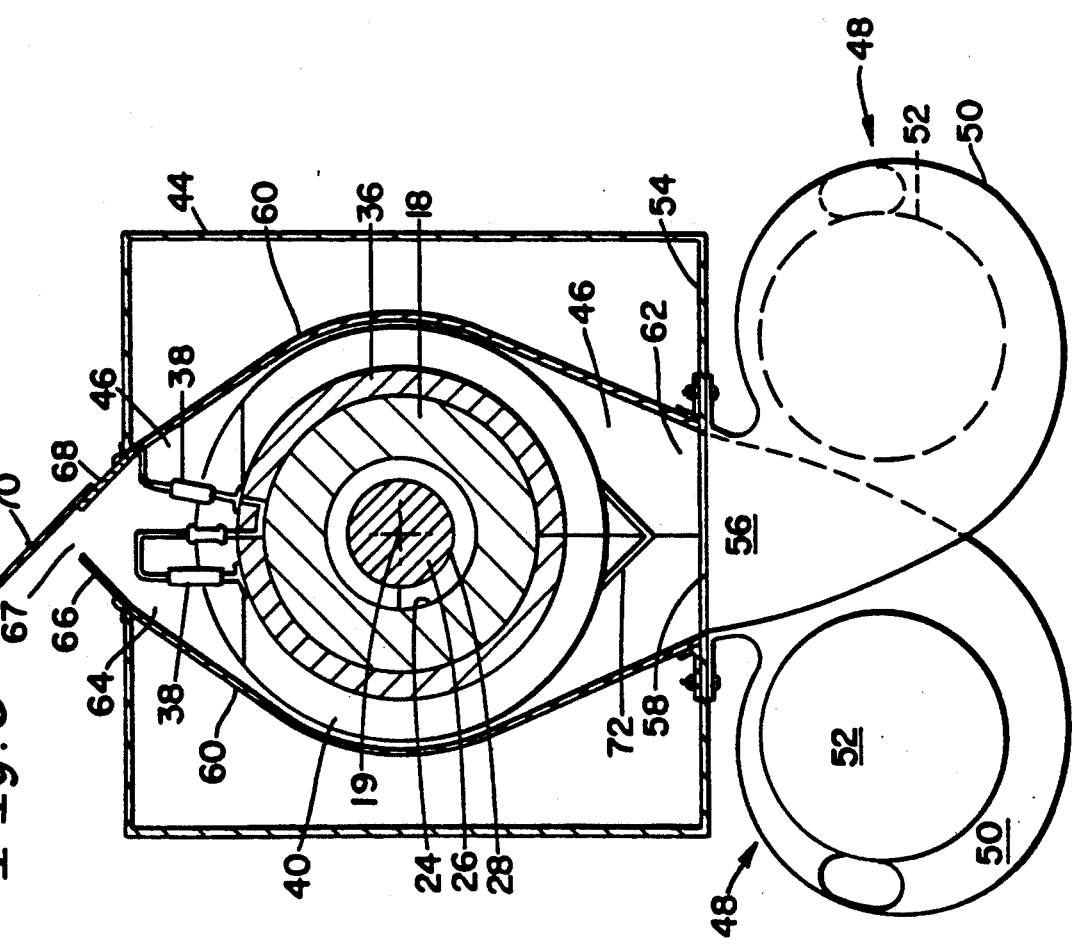
FIG. 3 is a transverse, cross-sectional view of the extruder shown in FIG. 1, taken along the line 3—3 thereof.

Surrounding the entire axial length of barrel 18 and of shells 36, as shown in FIG. 1, is an outer sheet metal cover or casing 44, which can be of generally rectangular cross section (as best seen in FIG. 3), one or more panels of which can be suitably hinged to permit access to the several shells 36.

The axial length of each of shells 36 defines a respective barrel temperature control zone. In the embodiment shown in FIG. 1, six such temperature control zones are shown and are disposed axially along barrel 18. Each of the temperature control zones is separated from an adjoining zone by means of a radially extending separator panel 46 that extends from the outer surface adjacent the ends of a shell 36 to outer cover 44.

For each of the separate groups of fins 40 an individual centrifugal blower 48 is provided for directing ambient cooling air over the fins and through the spaces between the fins, as will be hereinafter described in greater detail. Each blower 48 includes a fan section 50 and an associated individual fan motor 52 to drive the fan (not shown) within the fan section.

As shown in FIG. 1, each shell section 36 includes two axially spaced groups of radially outwardly extending cooling fins 40, and consequently two individual blowers 48 are provided for each shell section 36, each blower positioned radially outwardly from and associated with a particular group of fins 40. In the embodiment illustrated in FIG. 1 each blower 48 is positioned below barrel 18 and can be suitably bolted or otherwise carried by a bottom panel 54 of outer cover 44.

As shown in FIG. 3, each of blowers 48 is laterally offset from an adjacent blower associated with a given shell. The relative positioning of the respective blowers 48 along barrel 18 is more clearly shown in FIG. 2, from which the offset relationship of the several blower motors 52 and fan housings 50 is evident.

The flow path for the cooling air around the respective shells is best seen in FIG. 3. As shown, fan housing 50 terminates in a fan housing outlet duct 56 that diverges in an upward and outward direction and is connected to bottom panel 54 of outer casing 44 at a point at which a casing inlet flow aperture 58 is provided. Interiorly of outer casing 44 and extending upwardly from and along the longitudinally extending sides of the respective casing inlet flow apertures 58 is a sheet metal shroud 60 that defines an upwardly diverging cooling air inlet duct 62 that is a continuation of fan housing outlet duct 56. Shroud 60 is positioned in closely spaced relationship to and radially outwardly from fins 40 to direct and confine inlet air from blowers 48 to the spaces immediately above and the spaces between respective fins 40. Shroud 60 and separator panels 46 provide the confining surfaces for an internal cooling air flow path for a temperature zone defined by a particular shell 36.

Above the horizontal centerline 19 of barrel 18, the sides of shroud 60 converge, again to confine the cooling air flow, and to define a cooling air outlet duct 64 above the shells 36. Outlet duct 64 extends in an axial direction along the axis of barrel 18 and terminates at an elongated cap 66 that extends longitudinally along the upper surface of outer casing 44. Cap 66 is of generally trapezoidal cross section, being substantially an extension of outlet duct 64, one inclined wall 68 of which supports a continuous, longitudinally extending deflector sheet 70 to deflect the outwardly flowing cooling air to one side of extruder 10.

A longitudinally extending air flow divider 72 of generally triangular cross section can also be provided in cooling air inlet duct 62 to divide the incoming cooling air into two separate flow paths, each of which passes around respective opposite sides of a shell 36, to later recombine in cooling air outlet duct 64 before being exhausted through a longitudinally extending slot 67 in cap 66.

Preferably, each of blowers 48 has a relatively high airflow capacity, of the order of about 400–500 cubic feet per minute, to permit rapid cooling of shells 36 and thereby maintain the shell temperatures at a desired level.

As will be apparent to those skilled in the art, a suitable control system can be provided to regulate the electrical power to the respective embedded heater elements by controlling the power flow based upon the output of control thermocouple 42. Additionally, other suitable control elements can be provided to operate the respective blowers 48 in order to maintain a particular shell segment, and therefore an extrusion zone, at a predetermined temperature level. Further, it will be apparent that the respective blowers associated with a given zone can either be operated simultaneously which is preferred, or individually, as desired, and either at the same or at differing speeds, depending upon the temperature profile that is desired along the longitudinal axis of the barrel.

In operation, material to be plasticated is introduced into extruder barrel 18 at an upstream location (not shown) and is carried axially along the barrel in a generally helical direction by screw 26 as it rotates within barrel 18. Although heat is internally generated within the material as a consequence of mechanical working of the material as it is conveyed by the screw, the addition of external heat to raise the temperature of inner surface 24 of barrel 18 accelerates the plastication process. By suitably setting the power levels for the resistance heaters embedded within the respective axially disposed zones defined by shells 36, a desired barrel inner surface temperature profile can be maintained. By monitoring the barrel temperatures, the control system can regulate the power to maintain the desired temperature, and fluctuations in temperature can be accommodated either by increasing the power, should the temperature fall below a desired value, or by reducing the power and operating respective ones of cooling air blowers 48 if the temperature exceeds the desired level.

Cooling air is drawn from the ambient air by blowers 48 and passes along fan housing outlet ducts 56 and through casing inlet flow apertures 58. The cooling air enters inlet duct 62 and passes over flow divider 72 to provide two separate flow paths, each passing over and along one side of the associated bank of fins 40 with which the respective individual blower is associated. After passing around the fins the air enters cooling air outlet duct 64 and exits through slot 67 in cap 66.

It can thus be seen that the present invention provides distinct advantages over the prior art arrangements in that it provides separate heating and cooling sources for faster response to desired temperature changes, to maintain barrel temperatures at desired levels and thereby avoid overheating and possible thermal degradation of the material being plasticated. Additionally, the provision of forced air blowers to lower shell and barrel temperatures provides faster cooling response and also is a less costly, less complex arrangement that avoids possible leakage problems attendant with circulating liquid coolant systems.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. Apparatus for externally heating and cooling the wall of a mixing chamber, said apparatus comprising:
  a. a plurality of tubular shells each having an inner surface adapted to contact an exterior surface of the mixing chamber, the shells each positioned in end-to-end relationship to form an outer sleeve defining a series of contiguous, independent temperature control zones positioned along the exterior surface of the mixing chamber, each shell including independent, interiorly disposed heat sources for heating a respective shell to a desired temperature to transfer heat to an inner wall surface of the mixing chamber;
  b. each shell having a pair of groups of cooling fins extending substantially radially outwardly from an outer surface of the shell, each group of fins spaced axially from the other group of fins to define an annular area without fins, wherein the ratio of the radial height of the cooling fins to the thickness of the shell is about 1.6;
  c. a continuous external shroud positioned around and in closely spaced surrounding relationship with the shells and radially adjacent outermost ends of the fins for confining cooling air movement to spaces around and between the fins, a plurality of divider panels spaced from each other along the mixing chamber, each divider panel extending radially between the shroud and the shell for dividing the interior space between the shroud and the respective shells into a plurality of discrete temperature control sections to permit independent control of the temperature at a temperature control section to a desired temperature level by confining respective cooling air flows within a temperature control section; and
  d. at least one forced air circulating blower positioned exteriorly of each shell each blower spaced axially along the shell from an adjacent blower and having an air flow outlet oriented to discharge air radially toward a respective shell and over the cooling fins of the shell.

2. Apparatus in accordance with claim 1, wherein adjacent axially spaced blowers are circumferentially offset from each other relative to the mixing chamber longitudinal axis.

3. Apparatus in accordance with claim 1, wherein the shell has a wall thickness of about ⅜".

4. Apparatus in accordance with claim 1, wherein a separate blower is positioned radially opposite each group of fins.

5. Apparatus in accordance with claim 4, wherein the blowers are mounted on the shroud.

6. Apparatus in accordance with claim 5, wherein the blowers are mounted vertically below the respective shells and include air discharge outlets directed in an upward direction toward the fins of the respective shells.

7. Apparatus in accordance with claim 6, wherein the shroud includes a unitary cooling air exhaust slot extending axially along and through a surface of the shroud.

8. Apparatus in accordance with claim 7, including a deflector carried by the shroud along the cooling air exhaust slot for deflecting away from a machine operator cooling air that exits from the slot.

* * * * *